Sept. 13, 1955     W. M. HALL     2,717,995
REFLECTION TYPE INDICATING DEVICE
Filed Aug. 23 1951     3 Sheets-Sheet 1
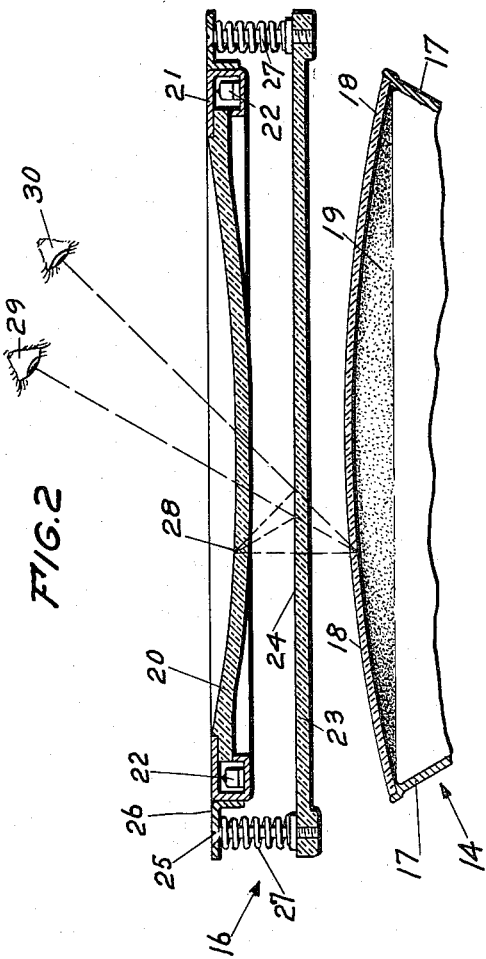
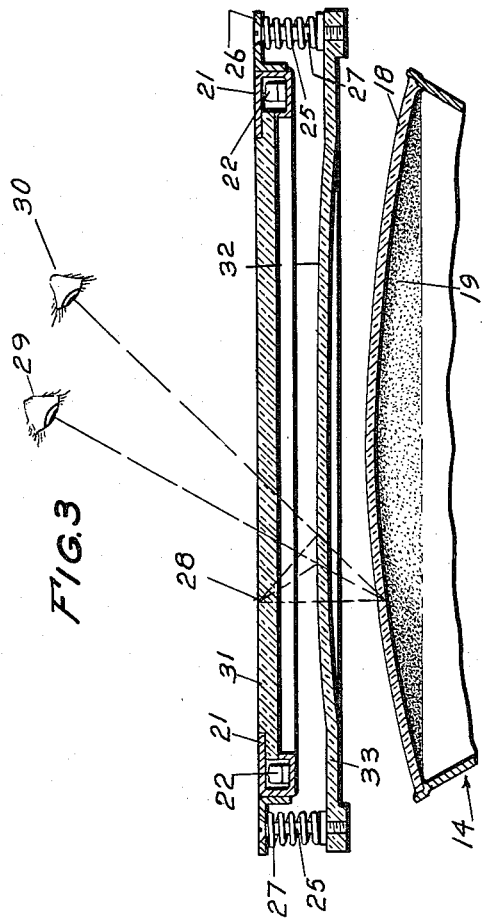
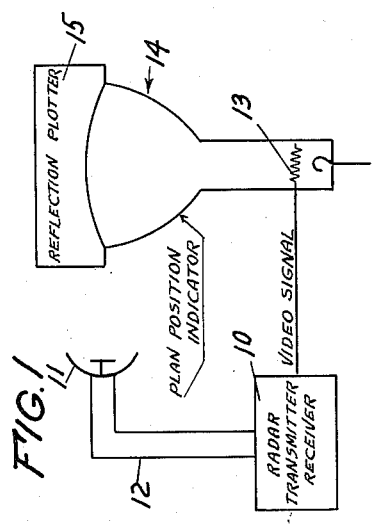
INVENTOR
WILLIAM M. HALL
BY Elmer J. Gorn
ATTORNEY Sept. 13, 1955 W. M. HALL 2,717,995
REFLECTION TYPE INDICATING DEVICE
Filed Aug. 23 1951 3 Sheets-Sheet 2
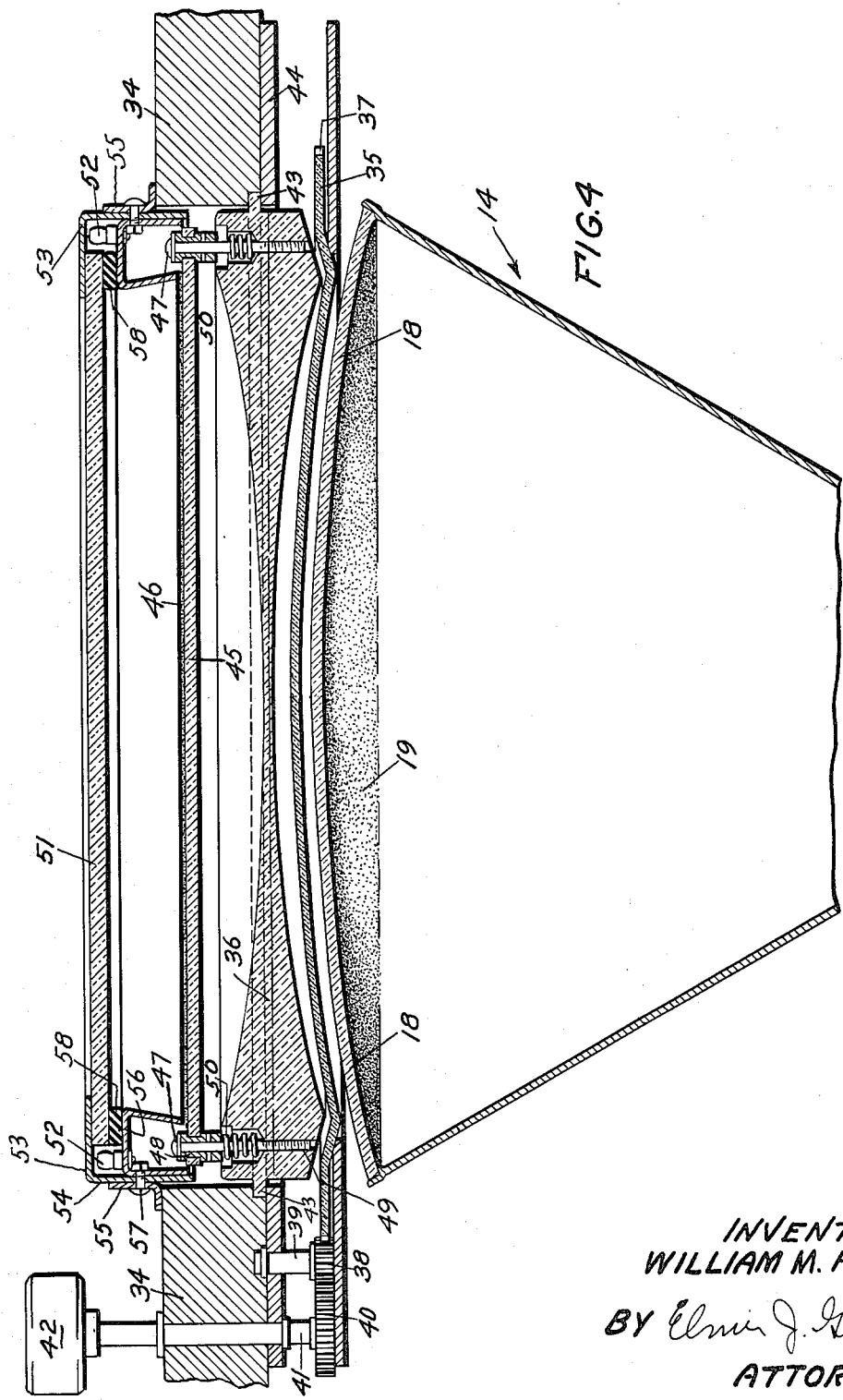
INVENTOR
WILLIAM M. HALL
BY Elmer J. Gorn
ATTORNEY Sept. 13, 1955  W. M. HALL  2,717,995
REFLECTION TYPE INDICATING DEVICE
Filed Aug. 23 1951  3 Sheets-Sheet 3
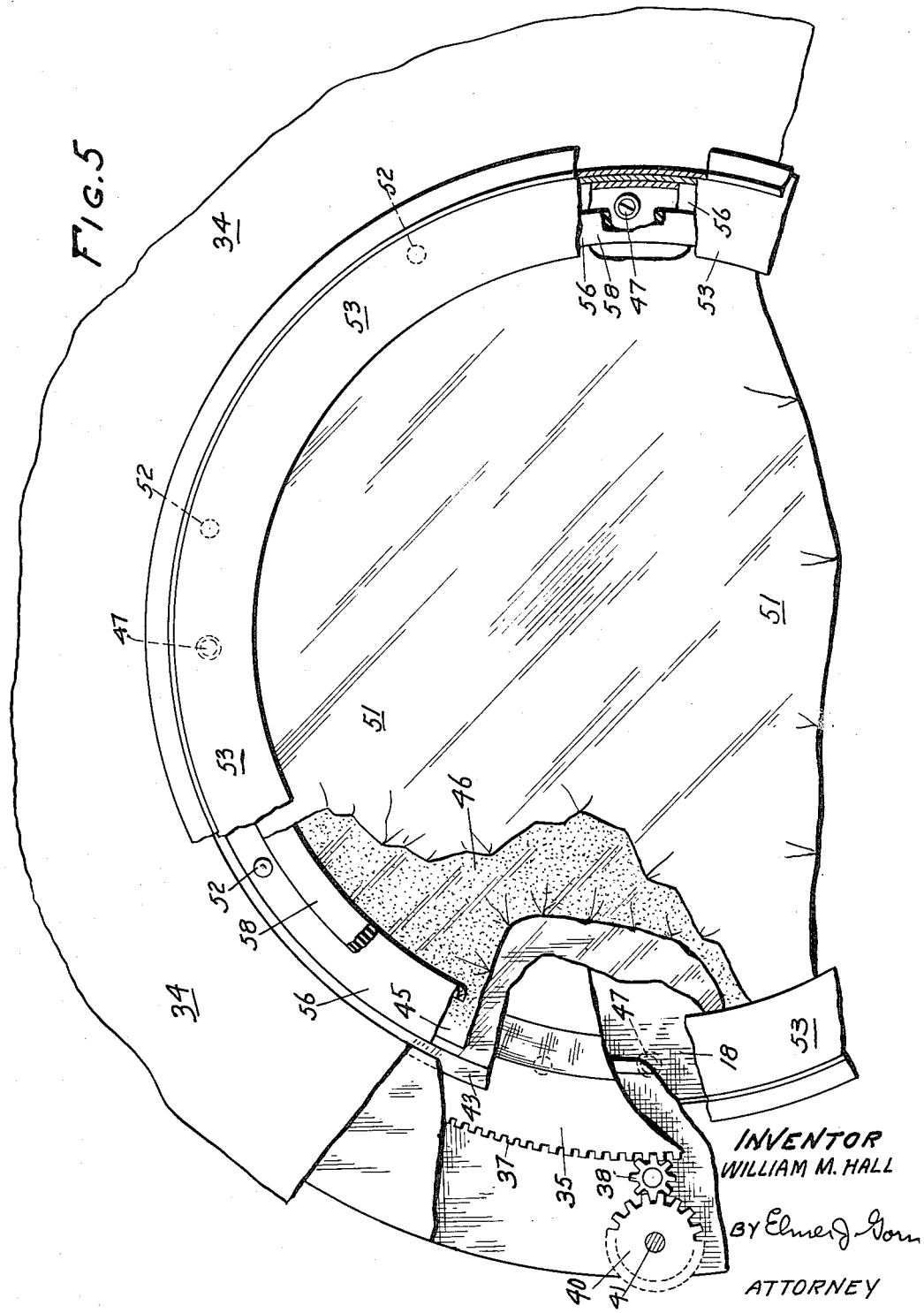
INVENTOR
WILLIAM M. HALL
By Elmer J. Gorn
ATTORNEY

United States Patent Office 2,717,995
Patented Sept. 13, 1955

2,717,995

REFLECTION TYPE INDICATING DEVICE

William M. Hall, Lexington, Mass., assignor to Raytheon Manufacturing Company, Newton, Mass., a corporation of Delaware Application August 23, 1951, Serial No. 243,209

2 Claims. (Cl. 340—368)

This invention relates to information plotting devices, and more particularly to information plotting devices used in conjunction with radar indicators.

It is well known that radar systems may be used for navigation and navigation control purposes. In general, such systems utilize a plan-position indicator wherein a pattern appears on the face of a cathode ray tube indicating the position of surrounding targets in a map-like relationship to the radar station which is usually but not necessarily positioned at the center of the pattern.

In applications such as harbor navigational control systems where it is desired to keep track of the courses of many moving objects such as ships, it has been found advantageous to plot positions of the ships periodically by hand in order to determine the courses of the ships from which, in turn, the probability of collision of any of the ships may be predicted in sufficient time to take precautionary measures.

A type of plotting board found to be convenient for this type of work is a reflection plotter comprising a transparent plate positioned above the face of the plan-position indicator tube on which marks may be made, for example, with a red crayon. A half silvered mirror is positioned substantially equidistant between the surface of the transparent plate, on which the marks are made, and the fluorescent coating of a cathode ray tube screen. Lights are positioned around the edges of the plate such that light will travel inward through the plate, and, upon passing the wax crayon marks on the surface, will be deflected downward to impinge on the half silvered mirror and be reflected back up to the observer's eyes such that the wax crayon marks on the plate will appear in the half silvered mirror to be positioned below the half silvered mirror at substantially the same distance as the marks are actually above the mirror. As a result, the marks appear to be projected down onto the fluorescent screen, the projections of said marks seeming to appear at substantially the same position on the screen when viewed from a wide range of directions above the plate.

Due to the necessity for curving the face of the cathode ray tube to withstand the atmospheric pressure outside with respect to the vacuum inside the tube, the reflection plotting system just described has certain inaccuracies therein. As a result, the position of the wax spot projected onto the cathode ray tube screen appears to vary as the spot is observed from different directions above the plate. This is extremely disadvantageous, since the observer will be moving around above the indicator observing the spot from different positions.

This invention discloses a plurality of species, whereby inaccuracy of the reflection plotter produced by the curvature of the cathode ray tube face may be substantially eliminated.

In a first embodiment of the invention, the plate on which the plotting marks are made has a curvature substantially equal to the curvature of the cathode ray tube face, said curvature being in an opposite direction from the curvature of the cathode ray tube face. The half silvered mirror surface is positioned substantially equidistant from the fluorescent screen on the cathode ray tube face and the surface of the plate on which the plotting marks are made.

In a further embodiment of the invention disclosed herein, the surface on which the plotting marks are made is flat and the half silvered mirror has a radius of curvature which is substantially twice as great as the radius of curvature of the cathode ray tube face. Thus, the half silvered mirror may be positioned substantially equidistant from the fluorescent screen on the cathode ray tube face and the surface of the plate on which the plotting marks are made over substantially the entire area of the plotting device.

In a still further embodiment of the invention disclosed herein, correction for the curvature of the cathode ray tube face is accomplished by a diverging lens positioned below the half silvered mirror and above the face of the cathode ray tube. The curvature of the lens and the coefficient of refraction therof are such that the apparent position of the fluorescent screen on the cathode ray tube face will lie in a flat plane beneath the half silvered mirror. The half silvered mirror is then positioned equidistant from the surface of the plate on which the plotting marks are made and the apparent position of the fluorescent screen on the cathode ray tube. For the purposes of this specification and claims, the distance between the apparent position of the cathode ray tube face and the half silvered surface will be termed the effective distance. Thus, the half silvered surface for this embodiment is positiond effectively equidistant between the surface of the plate or image source and the screen on the face of the cathode ray tube.

Other and further objects and advantages of this invention will become apparent as the description thereof progresses, reference being had to the accompanying drawings, wherein:

Fig. 1 illustrates a functional flow diagram of a radar system utilizing a plan-position indicator having a reflection plotter attached thereto;

Fig. 2 illustrates a transverse, cross-sectional view of a reflection plotter and cathode ray tube wherein the plotting plate has an equal and opposite curvature with respect to the face of the cathode ray tube;

Fig. 3 illustrates a transverse, cross-sectional view of a reflection plotter wherein the half silvered mirror has a radius of curvature substantially twice as great as the radius of curvature of the cathode ray tube face;

Fig. 4 illustrates a transverse, cross-sectional view of a further embodiment of this invention wherein a reflection plotter utilizes a lens to correct the curvature of the cathode ray tube face; and Fig. 5 illustrates a partially broken away plan view of the reflection plotter illustrated in Fig. 4.

Referring now to Fig. 1, there is shown a radar transmitter receiver 10, which may be of any desired type, which feeds signals to an antenna 11 by means of a wave guide 12. The signals are radiated from antenna 11 and impinge upon surrounding objects to produce reflected echo signals. The reflected echo signals are picked up by the antenna and passed down the wave guide 12 to be detected by the radar transmitter receiver 10. These signals are then fed in the form of video information to the control grid 13 of a cathode ray tube indicator 14. Cathode ray tube indicator 14 may be of any desired type employing well-known deflection and blanking circuits.

In the particular embodiment illustrated herein, cathode ray tube 14 is operated as a plan-position indicator with the cathode ray tube beam being deflected radially outward from the center position at the repetition rate of the radar transmitter receiver 10. The direction of the sweep is rotated synchronously with rotation of the antenna 11 such that the presentation on the fluorescent screen of the cathode ray tube 14 is, in effect, a map showing the distance and direction of surrounding objects from the radar system. Positioned above the fluorescent screen of the cathode ray tube 14 is a reflection plotter 15 which may be used to plot the position of the surrounding objects.

Referring now to Fig. 2, there is shown a reflection plotter 16 of the type which may be used on the cathode ray tube indicator 14. As shown in Fig. 2, the cathode ray tube 14 has a metallic outer container 17 to which is sealed a glass face 18 which bows out slightly. The inner surface of the glass face 18 is coated with fluorescent material, as at 19, so that, when an electron beam strikes the surface, a bright spot will appear thereon in a well-known manner. Positioned above face 18 is a plate 20 of transparent material such as plastic. The upper surface of plate 20 is bowed slightly downward such that it has a radius of curvature substantially equal to the radius of curvature of the fluorescent screen 19. Plate 20 is supported by an annular metallic ring 21 surrounding the outer edge of plate 20. Ring 21 has a transverse cross section which is substantially U-shaped. Positioned inside the U shape of ring 21 is a plurality of bulbs 22 spaced around the periphery of plate 20. The ring 21 shields the bulbs 22 from the view of an observer above plate 20, but allows the edges of the plates to be illuminated by the bulbs 22. Positioned between plate 20 and face 18 of tube 14 is a half silvered mirror comprising a plate 23, the upper surface of which has a partial coating of reflecting material, as at 24. Plate 23 is supported with respect to plate 20 by means of screws 25 which extend through an annular bracket 26 attached to ring 21, said screws threadedly engaging plate 23. Springs 27 surround screws 25 resiliently urging plate 23 away from bracket 26. Adjustment of the distance between plate 23 and plate 20 is accomplished by adjustment of screws 25. The upper silvered surface 24 of plate 23 is adjusted such that it is substantially equidistant from the fluorescent screen 19 and the upper curved surface of plate 20.

If a mark is made, for example, with a wax crayon on the upper surface of plate 20, as at 28, light from bulbs 22 passing through plate 20 will have a portion thereof deflected downward upon passing mark 28. An observer positioned above plate 20, for example, as at 29, upon looking downward, will see the reflection of spot 28 on the half silvered surface 24, said reflected spot appearing to be superimposed on the fluorescent screen 19 at a point directly below mark 28. If the observer moves to a different position, as at 30, the projection of mark 28 still appears directly below the mark 28 and still superimposed upon screen 19.

Referring now to Fig. 3, there is shown a further embodiment of the invention wherein the upper surface of a plate 31 on which the plotting marks are made may be absolutely flat, thereby facilitating the use of transparent maps above the plotting board. Plate 31 is of transparent material and is supported by a ring structure 21 in which are positioned bulbs 22 similar to that described in Fig. 2. Plate 31 is positioned over the face 18 of a cathode ray tube 14 similar to that described in Fig. 2. Positioned half way between the fluorescent screen 19 on the inner side of tube face 18 and the upper surface of plate 31 on which the plotting marks are made is a half silvered surface 32 comprising the upper surface of a transparent plate 33. Plate 33 is curved slightly upward having a radius of curvature substantially twice as great as the radius of curvature of tube face 18. Plate 33 is rigidly and adjustably secured with respect to upper ring member 21 by means of bracket 26, screws 25 and springs 27 in the same manner as that described in Fig. 2.

By making the radius of curvature of the member 33 on which the half silvered surface 32 is placed twice as great as the curvature of face 18 of cathode ray tube 14, the silvered surface 32 is equidistant from the upper surface of plate 31 and the fluorescent screen 19 over substantially the entire area of the plotting board. As a result, the projection of a mark 28 on the upper surface of plate 31 will appear to be projected in a direction substantially normal to the tangent plane of the reflection surface in the vicinity of the region where mark 28 was made onto the fluorescent screen 19 when viewed from any of a variety of positions, for example, as indicated by the eyes 29 and 30. Similarly, marks positioned in other places on upper surface 31 will be projected vertically downward onto the fluorescent screen.

Referring now to Figs. 4 and 5, there is shown a still further embodiment of the invention. The cathode ray tube 14 is adapted to be used as a plan-position indicator having a face plate 18 whose inner surface is coated with fluorescent material 19. Cathode ray tube 14 is rigidly supported in a frame member partially shown at 34 by a support structure, not shown. Positioned above the face 18 of cathode ray tube 14 is a transparent plate 35 having a curved surface conforming to the surface of tube face 18. Plate 35 is rotatably supported on a support member rigidly attached to frame member 34 and has teeth 37 cut in the periphery thereof. Teeth 37 engage an idler gear 38 mounted on a shaft 39. Idler gear 38, in turn, engages a drive gear 40 rigidly attached to a shaft 41 which extends upwardly through frame member 34 and terminates in a knob 42. By rotation of knob 42, the plate 35 may be caused to rotate. Plate 35 has inscribed thereon any desired cursor lines such as circles, parallel lines, or radial lines, the purpose of said lines being to aid in the prediction of courses and the determination of bearings and positions. Positioned above plate 35 is a lens 36 made of transparent material. As shown here, lens 36 is a double concave lens. However, if desired, it could be a planar concave lens, or a concave convex lens. Lens 36 has a lip 43 extending around the periphery thereof which engages a recess in frame member 34 and is clamped thereto by an annular ring member 44. Positioned above lens 36 is a transparent plate 45, the upper surface 46 of which is partially silvered. Plate 45 is rigidly and adjustably positioned with respect to lens 36 by means of screws 47 which extend through bushings 48 in plate 45 at points adjacent the periphery thereof and threadedly engage lens 36 as, for example, at 49. Springs 50 surround screws 47 and yieldably urge plate 45 away from lens 36.

By adjustment of screws 47 the distance between plate 45 and lens 36 may be adjusted. Positioned above plate 45 is a plate 51 on the upper surface of which marks may be made. At points around the periphery of plate 51 are positioned bulbs 52 adapted to project light into the edges of plate 51. An annular metallic shield member 53 covers the top of bulbs 52 and engages a recess in the upper surface of plate 51. A lip 54 struck down from the outer edge of shield 53 engages an annular bracket member 55 which is attached to frame member 34. Bulbs 52 are attached to a support member 56 which is bolted through member 54 to bracket 55 by bolts 57, thereby rigidly supporting the entire bulb assembly. An annular gasket member 58 is positioned between support member 56 and plate 51, thereby preventing emission of light from bulbs 52, except into the edges of plate 51.

In operation, the lens member 36 makes the fluorescent coating 19 on the inner side of face 18 of tube 14 appear to lie in a flat plane, and the half silvered surface is adjusted to lie equidistant between the apparent position of the fluorescent screen and the upper surface of plate 51.

This device will project marks placed on the upper surface of plate 51 down onto the apparent position of screen 19 such that projections of the marks will appear to be vertically below the marks when viewed from a wide range of positions above the plate 51.

The amount of correction or flattening of the apparent position of the fluorescent screen produced by the lens at any point depends upon the thickness of the lens at that point and the coefficient of refraction of the lens material. The distance which the lens raises the apparent position of the fluorescent screen above the actual position of the fluorescent screen may be determined at any point on the screen to a good degree of accuracy by the following formula:

$$D = T\left(1 - \frac{1}{\eta}\right)$$

where $D$ = the distance of the apparent position of the fluorescent screen above the actual position thereof at any point,
$T$ = the lens thickness at the point, and
$\eta$ = the coefficient of refraction of the lens material.

An advantage inherent in the use of lens 36 is its ability to compensate for the natural radial nonlinearity of the presentation on the fluorescent screen 19 by the electron beam within the tube. This nonlinearity, introduced by the curvature of the tube face, causes the presentation to expand as it moves outward from the center of the tube. While it is relatively easy to introduce a correction into the electrical circuitry to compensate for this nonlinearity when the starting position of the beam is substantially the center of the tube face, use of an off center starting position presents an extremely complex problem in circuitry compensation.

This completes the description of the specific embodiments of the invention described herein. However, many modifications thereof will be apparent to persons skilled in the art without departing from the spirit and scope of this invention. For example, other types of displays than standard P. P. I. displays may be used. Other indicating devices may be used in place of the cathode ray tube 14, for example, a ground glass screen on which a pattern is projected, and other uses can be made of the plotting device besides radar indicating applications. Accordingly, it is desired that this invention be not limited by the particular details illustrated herein, except as defined by the appended claims.

What is claimed is:

1. An indicating device comprising a cathode ray tube comprising a curved fluoroescent screen adapted to have a plan-position indicating pattern thereon, means for superimposing plotting marks on said screen comprising an image source oriented to produce an image on said screen, a dielectric lens positioned between said screen and said image source, and a partially reflecting surface positioned equidistant between the virtual image of said source, as seen through said lens, and said image source.

2. An indicating device comprising a curved image screen, means for producing a first image on said screen, means for producing a second image on said screen comprising an image source oriented to produce an image on said screen, a dielectric lens positioned between said screen and said image source, and a partially reflecting surface positioned equidistant between said screen and said image source.

References Cited in the file of this patent

UNITED STATES PATENTS

| | | |
|---|---|---|
| 2,330,604 | Messner | Sept. 28, 1943 |
| 2,540,110 | Gall | Feb. 6, 1951 |
| 2,570,738 | Wikkenhauser | Oct. 9, 1951 |
| 2,580,240 | Newman | Dec. 25, 1951 |
| 2,588,035 | O'Neil | Mar. 4, 1952 |
| 2,655,836 | Sherwin | Oct. 20, 1953 |